United States Patent Office

PATRICK KENNEDY, OF NEW YORK, N. Y.

Letters Patent No. 65,680, dated June 11, 1867.

IMPROVED CEMENT FOR FIXING DOOR-KNOBS, &c.

*The Schedule referred to in these Letters Patent and making part of the same.*

TO ALL WHOM IT MAY CONCERN:

Be it known that I, PATRICK KENNEDY, of the city, county, and State of New York, have invented a new and improved Cement; and I do hereby declare that the following is a full, clear, and exact description thereof, which will enable others skilled in the art to make and use the same.

This invention relates to a new composition for making a cement, which is to be particularly adapted for securing door-knob tops to the metal shanks, but which may also be used for other purposes.

The cement is composed of the following ingredients, in about the proportions set forth, and compounded in the manner hereinafter described: Two parts of alum, (sulphate of alumina,) one part of copperas, (sulphurate of iron,) and one part of fine white sand, are mixed in about four (4) parts of water, and are boiled until the alum is dissolved. The mixture is boiled down so as to evaporate the water, until the compound has about the consistency of gruel. It is then ready for use, and will, after having been applied, harden, so as to be harder and less porous than marble. The alumina and astringent properties of the alum bind the particles of the sand and unite the same, so that they will adhere, while the copperas prevents the cement from becoming brittle, and adds to its substance.

Having thus described my invention, what I claim as new, and desire to secure by Letters Patent, is—

A cement composed of the ingredients substantially in the manner herein set forth.

PATRICK KENNEDY.

Witnesses:
SAMUEL YOUNG,
JAMES MULHALL.